Aug. 19, 1969 — M. J. CREPEAU — 3,461,485

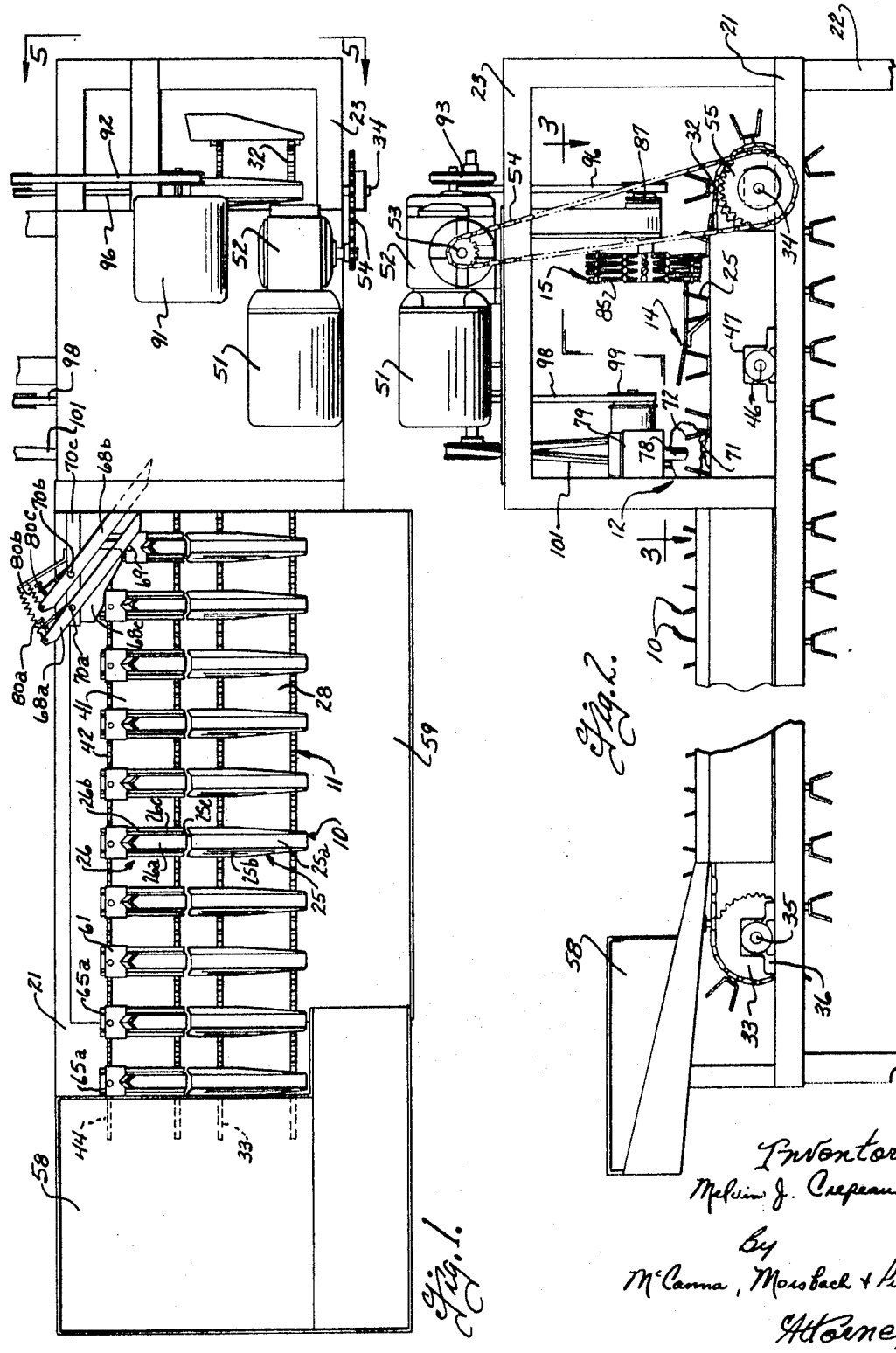

FISH DEHEADING MACHINE

Filed Oct. 11, 1966 — 3 Sheets-Sheet 3

Inventor
Melvin J. Crepeau
By
McCanna, Morsbach & Pillote
Attorneys 3,461,485
Patented Aug. 19, 1969

1

3,461,485
FISH DEHEADING MACHINE
Melvin J. Crepeau, Escanaba, Mich., assignor to La Pine Brothers, Inc., Gladstone, Mich., a corporation of Michigan
Filed Oct. 11, 1966, Ser. No. 585,841
Int. Cl. A22c 25/12, 25/14
U.S. Cl. 17—63
18 Claims

ABSTRACT OF THE DISCLOSURE

An apparatus for deheading fish in which the fish are advanced sidewise past the deheading station by a conveyor apparatus having a plurality of endwise aligned head and body receiving fish carriers, and in which the head receiving carriers have a nose engaging member movably mounted thereon and mechanism is provided for moving the nose engaging member in a direction to shift the fish tailward until a preselected projection on the fish engages a fish locating means on one of the carriers to thereby longitudinally position the fish in the carriers as they are advanced toward the deheading station.

---

This invention relates to a fish dressing apparatus and particularly to an apparatus for deheading fish.

A general object of this invention is to provide a simple and reliable apparatus for deheading fish which will accurately position fish of different size with relation to a fish head cutting apparatus as the fish is moved past the head cutting apparatus to enable severing of the fish head from the fish body with a minimum of waste of edible flesh.

Another object of this invention is to provide an apparatus for deheading fish in which a conveyor having fish body receiving pockets and fish head receiving pockets advances the fish sidewise past a head cutter that passes between the pockets, and which has an improved arrangement for moving the fish lengthwise in the pockets and for accurately locating the fish in the pockets in proper position to have the head severed by the head cutter with a minimum of waste of edible flesh.

A more particular object of this invention is to provide an apparatus for deheading fish in which the fish receiving pockets on the conveyor have means for locating the fish by engagement with a preselected protuberance intermediate the ends of the fish and in which the fish is moved tailward in the pockets until the protuberance on the fish engages the fish locating means on the pockets.

Still another object of this invention is to provide an apparatus for deheading fish in which a conveyor having fish body receiving pockets and fish head receiving pockets advances the fish sidewise past a head cutter that passes between the pockets and which has means on the body receiving pockets for holding the fish against tailward movement and means on the head receiving pockets for holding the fish against forward movement when the fish are in proper position in the pockets.

Yet another object of this invention is to provide an apparatus for deheading fish having an improved rotary cutter arrangement for severing the head from the fish body along a broken line so arranged as to minimize waste of edible flesh.

2

These, together with other objects and advantages of this invention, will be better understood by reference to the following detailed description when taken in connection with the accompanying drawings wherein:

FIGURE 1 is a top plan view of a fish deheading machine embodying the present invention;

FIG. 2 is a fragmentary side elevational view of the fish deheading machine of FIG. 1;

Figure 3:
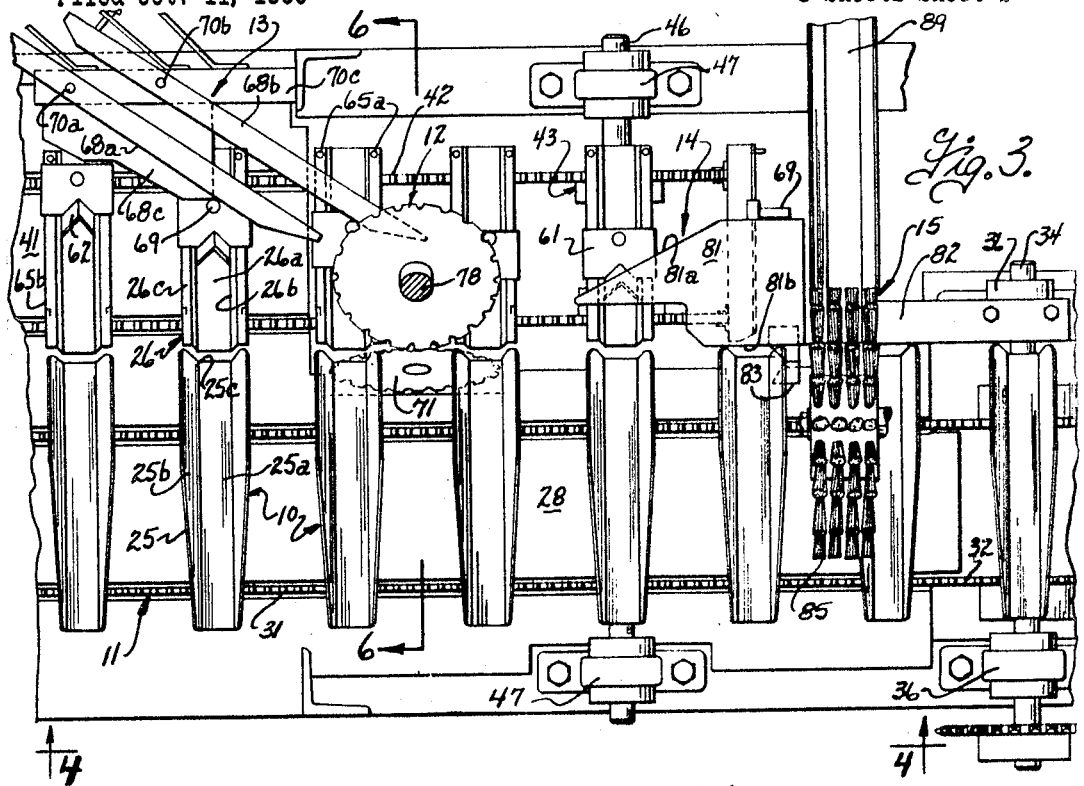
FIG. 3 is a fragmentary horizontal sectional view taken on the plane 3—3 of FIG. 2 and showing the parts on a larger scale.

The fish deheading apparatus in general includes a plurality of fish carriers 10 each for receiving and supporting a fish and a conveyor mechanism 11 for advancing the fish carriers and fish past a head cutting apparatus 12 located at a head cutting station. The fish carriers have a means engageable with a protuberance such as a fin on the fish for locating the fish in a predetermined longitudinal position in the carriers, and an apparatus 13 is provided for effecting tailward shifting of the fish in the carriers as they are advanced toward the cutting station. An apparatus 14 is preferably provided for holding the heads in the carriers after they have been severed from the fish bodies and until the heads and bodies are substantially separated, and a further mechanism 15 is advantageously provided for thereafter discharging the fish bodies from the carriers.

The fish dressing apparatus is mounted on a support structure herein shown in the form of a main frame 21 supported on legs 22 with a supplementary support frame 23 mounted adjacent one end of the main frame. The fish carriers 10 include a plurality of body receiving carriers 25 herein shown in the form of a tray having a bottom 25a and upwardly diverging sides 25b for receiving the body of a fish f and for supporting the body with the backbone in a generally upright plane. The fish carriers 10 also include a plurality of head receiving carriers 26 herein shown in the form of trays having a bottom wall 26a and upwardly diverging side walls 26b. For reasons pointed out hereinafter, the head receiving carriers are preferably formed with laterally extending flanges 26c along opposite side edges thereof. Any suitable endless-type conveyor mechanism may be used for advancing the fish body carrier. In the embodiment illustrated, the fish body carriers 25 are supported on a platform 28 having chain receiving troughs 28a and 28b (FIGS. 5 and 6) along opposite sides thereof and the conveyor mechanism for advancing the body receiving carriers along the platform 28 is in the form of a pair of endless chains 31 entrained over sprockets 32 and 33 respectively nonrotatably secured to shafts 34 and 35. The shafts are rotatably journaled as by bearings 36 (FIG. 3) adjacent opposite ends of the main frame 21, and the body receiving carriers are attached to the chains as by brackets 38 at spaced points along the chain.

The head receiving carriers 26 are preferably formed separate from the body receiving carriers but are advanced along a path in unison therewith and with the head receiving carriers in substantial alignment with a respective one of the body receiving carriers. Any suitable endless-type conveyor mechanism may be used for advancing the head receiving carriers. In the embodiment illustrated, the head receiving carriers 26 are supported on a platform 41 extending lengthwise of the frame and having an offset portion 41a (FIG. 6) forming a chain receiving trough conveniently formed integrally with the chain receiving trough 28a of the platform 28 and the conveyor mechanism for advancing the head receiving carriers is in the form of a second pair of endless chains 42 entrained over sprockets 43 and 44, it being understood that the conveyor mechanism could be of the so-called table-top type, if desired. The conveyor chains 42 for the head receiving carriers are preferably made somewhat shorter than the chains for the body receiving carriers, and, as shown, the sprockets 44 are nonrotatably connected to the same shaft 35 as the sprockets 33 while the other sprockets 43 are nonrotatably secured to a shaft 46 located intermediate the shafts 34 and 35 and supported as by bearings 47 on the main frame 21. As will be seen, the head receiving carriers will move in unison with the body receiving carriers as they are advanced along the platforms 41 and 28 respectively by reason of their connection to the common shaft 35. However, the head receiving carriers traverse a somewhat shorter loop than the body receiving carriers. Any suitable means may be provided for driving the conveyors and, as shown, a drive motor 51 is mounted on the supplementary support frame 23 and connected through a speed reducer 52, sprocket 53 and chain 54 to a sprocket 55 on the shaft 34. An enlarged receptacle 58 may be provided adjacent one end of the main frame for receiving a quantity of fish and a loading platform 59 provided alongside the frame for supporting fish until they can be loaded into the carriers. In the present apparatus, the carriers are adapted to be hand loaded in a manner described more fully hereinafter.

Figure 5:
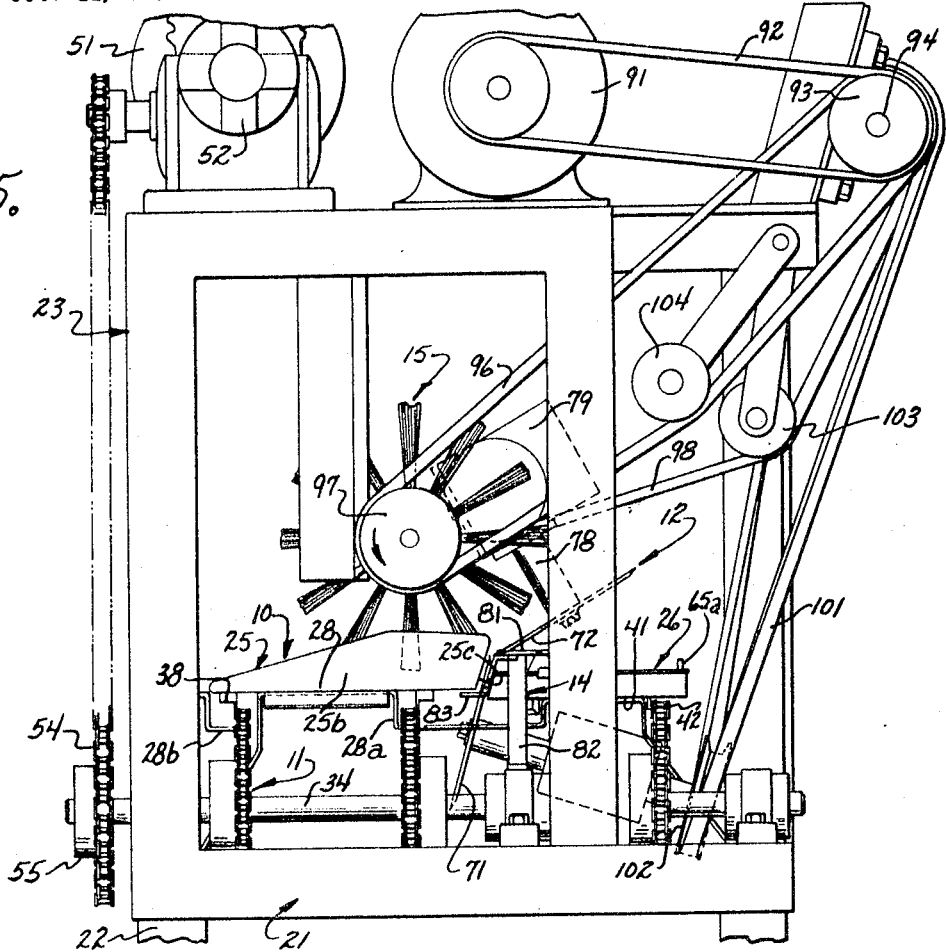
FIG. 5 is a fragmentary end elevational view taken on the plane 5—5 of FIG. 1 and illustrating the parts on a larger scale than FIG. 1.
Figure 6:
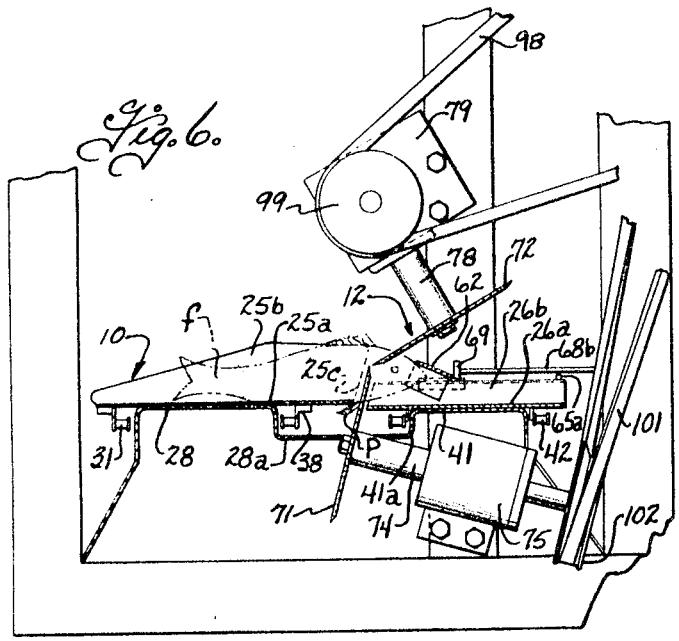
FIG. 6 is a fragmentary transverse sectional view taken on the plane 6—6 of FIG. 3.

As previously described, the body receiving carriers 25 and the head receiving carriers 26 move in unison with each other and in substantial alignment as they are advanced along the platforms 28 and 41 and the adjacent ends of the aligned carriers are spaced apart and provide an opening therebetween to allow passage of the head cutters 12 therethrough. In order to minimize waste of edible flesh in severing the head from the body, it is desirable to accurately position the fish with respect to the opening between the body and head receiving carriers. The fish being dressed are frequently of non-uniform size, and the length of the fish head varies along with the length of the body so that it is not possible to accurately position the fish by locating the fish with respect to either he head or tail of the fish. The fish deheading apparatus of the present invention is arranged to locate the fish by engagement with a protuberance on the fish having a generally fixed relation to the line of juncture between the head and body for fish of varying size. In the preferred embodiment illustrated, the apparatus is specifically designed for deheading fish of a species such as Perch having pectoral fins P located in close proximity to the head and having a relatively uniform location with respect to the head, even in fish of different size. The end 25c of the body carrier 25 is arranged to engage the pectoral fins P on the fish when the fish is moved tailward in the carrier to thereby provide a fish locating means or shoulder to accurately position the fish in the carriers and to also hold the fish against further tailward movement. It is to be understood, however, that the fish locating means may be modified, if necessary, for different species of fish to engage other protuberances such as other fins whose position with respect to the head does not vary substantially with different sized fish of that species or, alternatively, to engage a different protuberance such as the opercle on the fish head, as by providing inwardly directed shoulders on either the head carriers 26 or the body carriers 25. In order to facilitate passage of the pectoral fins to the underside of the body carrier, the carrier support platform 41 is preferably arranged to support the head receiving carriers with the bottom 26a thereof at a level slightly below the bottom 25a of the body receiving carriers as best shown in FIGS. 5 and 6. With this arrangement, the relatively soft belly of the fish will ride on the bottom 25a of the respective body receiving carrier 25 as the fish is moved tailward so that the pectoral fins P will pass along the outer side of the body receiving carrier and engage the locating shoulder 25c at the end of the body receiving carrier to limit tailward movement of the fish.

Figure 7:
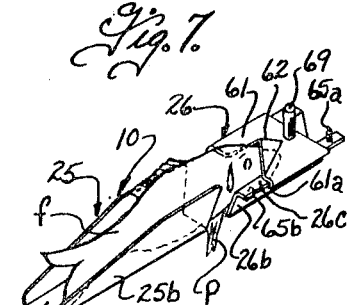
FIG. 7 is a perspective view of a fish carrier and illustrating a fish positioned therein.

The means 13 for shifting the fish tailward in the carriers includes a nose engaging member individual to each of the head carriers 26, and which nose engaging members are movable lengthwise of the respective head receiving carrier to engage the nose of a fish and shift the same rearwardly. The nose engaging members are preferably slidably supported on the head receiving carriers and, as shown, comprise a slide member 61 which slidably overlies the flanges 26c on the head receiving carriers 26, the slide member having inturned flanges 61a engageable with the underside of the carrier flanges 26c to retain the slide member thereon. The nose engaging member also includes a preferably V-shaped member 62 which is inclined downwardly in a direction away from the body carrier 25, as best shown in FIGS. 6 and 7, so as to press the head of the fish downwardly toward the bottom of the head carrier while moving the fish tailward to assure that the pectoral fins P will pass below the underside of the body receiving carrier and to also hold the head in position on the head receiving carrier. In addition, it will be noted that the generaly V-shaped configuration of the member 62 will produce a centering action of the head with respect to the head receiving carrier and will also aid in holding the fish in an upright condition, during the subsequent severing of the head from the fish body.

The fish are manually loaded into the carriers and, during loading, the fish are pressed in a forward direction against the movable nose engaging members to push the latter to their forwardmost position against stop means such as pins or protuberances 65a on the nose receiving carriers. When the nose engaging members are in their forward position, the fish head and a substantial portion of the fish body are disposed in the head receiving carriers and a means is provided for shifting the nose engaging members toward the body receiving carriers until the protuberance such as the pectoral fins P engage the fish locating means such as the shoulder 25c. This shifting means includes at least one and preferably a plurality of cam members, herein shown three in number and designated 68a, 68b and 68c. The cam members are arranged to engage follower pins 69 on the nose engaging members, and at least some of the cam members are made laterally yieldable. As shown, the cam members 68a and 68b are in the form of cam levers pivotally mounted on pins 70a and 70b in a mounting block 70c secured to the frame. The cam levers are inclined to the path of movement of the fish carriers, and the cam levers are yieldably urged by springs 80a and 80b (FIG. 1) in a direction to apply a yieldable pressure to the nose engaging members as they move past the cam levers and sufficient to move the nose engaging members and fish tailward until the protuberance such as the fins P on the fish engage the fish locating means 25c. Stops 80c may be provided to limit inward swinging movement of the cam levers. The laterally yieldable cam members are arranged so that the force applied thereby is insufficient to push the fish after the fins engage the locating shoulder, and the cam members then yield to allow passage of the followers 69. As will be seen from FIGS. 1 and 3, as the followers 69 pass off the first yieldable cam member 68a, they engage a second yieldable cam member 68b so that the successive cam members produce a desirable "jogging" action on the nose engaging member. At least one of the yieldable cam members such as 68b is arranged to engage the follower pins 69 as the fish carriers move past the cutters to hold the head in position at that time. The cam member 68c may advantageously be made fixed or rigid and positioned to engage the follower pins 69 somewhat in advance of the yieldable cam members 68a and 68b to effect an initial shifting of the nose engaging members toward the body receiving carriers 25. The fixed cam member 68c is shaped and dimensioned such that it shifts the nose engaging members and fish to an intermediate position outwardly of the position at which the pectoral fins P on the fish engage the locating shoulder 25c on the body receiving carriers, and the yieldable cam members are arranged to thereafter engage the follower pins 69 and complete the tailward shifting of the fish. A second stop means, herein shown in the form of kerfs 65b (FIGS. 3 and 7) are preferably provided on the head receiving carriers to limit movement of the nose engaging members off the inner end of the head receiving carriers.

Figure 4:
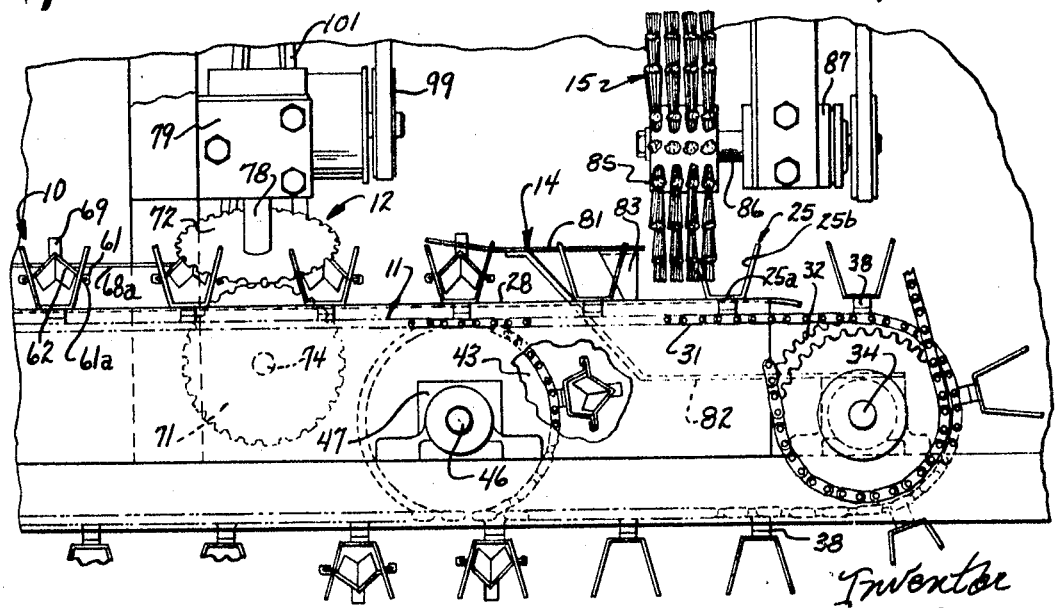
FIG. 4 is a fragmentary side elevational view taken on the plane 4—4 of FIG. 3.

The head cutting mechanism 12 advantageously comprises a pair of rotary cutter blades at the deheading station for making a pair of intersecting cuts which are angulated relative to each other and to the fish body so as to minimize the waste of edible flesh during severance of the head from the body. The cutter blades have sharpened peripheries and at least one of the cutter blades is preferably notched or toothed as shown in FIGS. 3 and 4. The cutter blade 71 is secured to a shaft 74 mounted for rotation in a bearing block 75 at the underside of the platform 41. The blade 71 is supported for rotation in a plane extending longitudinally of the path of travel of the fish carriers and is preferably inclined to the vertical as shown in FIGS. 5 and 6. The blade extends upwardly from below the carriers through the opening between the body receiving carrier 25 and the head receiving carrier 26 to a level below the top of the fish, and preferably adjacent the backbone of the fish. The lower cutting blade 71 is inclined upwardly and forwardly at a slight angle to the vertical, herein shown of the order of fifteen degrees, to remove all of the gill openings at the underside of the fish while extending closely adjacent the operculum in the region of the backbone of the fish. The other cutter blade 72 is secured to a shaft 78 rotatably supported in a gear box 79. The blade 72 is supported for rotation in a plane paralleling the path of movement of the fish by the coveyors, which plane is inclined to the vertical and to the plane of rotation of the blade 71. The blade 72 extends downwardly from above the fish and has its lower edge extending closely adjacent the upper edge of the blade 71 to form an intersecting cut therewith. The angle of the blades 71 and 72 will vary for different fish and, for fish such as Perch, the blade 72 is preferably rotatably supported in a plane inclined at about sixty degrees to the vertical so that the fleshy portion at the top of the fish behind the head remains attached to the body of the fish during severance of the head. With the blade 71 inclined at about fifteen degrees to the vertical and the blade 72 inclined at about sixty degrees to the vertical, it will be seen that the included angle between the blades at the head side of the fish is about one hundred thirty-five degrees.

The head after severance from the fish body remains in the head receiving carrier 26. However, since the conveyors for the head receiving carriers are shorter than the conveyors for the body receiving carriers, the heads are discharged from the head receiving carriers before the corresponding body is discharged from its body receiving carrier. The heads tend to be discharged from the head receiving carriers as the carriers pass around the sprockets 43. However, there are times when the cutters 12 do not completely sever fish heads from the body and some viscera remain uncut and tend to drag the fish heads along with the body. The apparatus 14 is provided to hold the heads in the head receiving carriers as they pass around the sprockets 43 until the uncut viscera are either severed or pulled from the fish body. The apparatus 14 includes a member shown at 81 mounted to overlie the path of travel of the heads on the head receiving carriers as they move around the sprockets 43 to temporarily hold the heads in the head receiving carriers until the head receiving carriers move out of registry with the body receiving carriers. The member 81 is supported on a bracket 82 and as will be seen, member 81 and bracket 82 extend generally tangent to the path of movement of the fish heads to hold the same in the head receiving carriers as they move around the sprockets 43. The member 81 preferably has one edge 81b arranged to extend alongside the path of movement of the ends 25c of the body receiving carriers to prevent endwise movement of the fish bodies out of the body receiving carriers as the head receiving carriers move around the sprockets 43. The member 81 is also advantageously arranged to retract the nose engaging members and, for this purpose, is formed with a cam edge 81a inclined to the path of travel of the conveyors and arranged to engage the followers 69 as the head receiving carriers start to move around the sprockets. The cam edge 81a operates to retract the nose engaging members away from the fish heads as the head receiving carriers begin movement around the sprockets 43 so that the heads can thereafter drop out of the head carriers as the carriers move around the lower portion of the sprockets 43. A cutter 83 is advantageously provided for severing any uncut viscera extending out of the fish bodies after they pass the head cutters 12. The cutter 83 is conveniently attached to the member 81 and preferably extends downwardly alongside the path of movement of the inner ends 25c of the body carriers 25 and then laterally below the bottom walls 25a thereof, as shown in FIGS. 3, 4 and 5. The leading edge of the cutter may be made V-shaped as shown in FIG. 3 to assist cutting any viscera hanging from the end of the fish bodies.

The fish bodies move along in the body receiving carriers 25 past the head discharge station and can be discharged off the end of the conveyor as the body receiving pockets move around the sprockets 32. However, the body discharge means 15 is advantageously provided to discharge the bodies laterally of the conveyor. As shown, the body discharge means is in the form of a rotary brush 85 mounted on a shaft 86 journaled in a bearing block 87. The brush is rotatable in a plane generally transverse to the path of movement of the fish by the conveyors, and the brush has resilient bristles which extend downwardly into the body receiving carriers to propel the fish crosswise of the carriers. The brush is rotatable in the direction indicated in FIG. 5 to propel the fish bodies forwardly out of the body receiving carriers, and a chute 89 is provided for receiving the bodies and for guiding them to a suitable body receiving station (not shown).

Any suitable means may be provided for driving the rotary cutters 71 and 72 and the body discharge means 85. As shown, a motor 91 is mounted on the supplementary support frame 23 and is connected through a belt 92 to a pulley 93 on a cross-shaft 94. The cross-shaft is connected through one belt 96 to a brush drive pulley 97 for rotating the body discharge means 15. The cross-shaft is also connected through a second belt 98 to a drive pulley 99 on the gear box 79 to rotate the upper cutter 72. The cross-shaft is connected through a third belt 101 to a drive pulley 102 on the shaft 74 for the lower cutter blade 71. Belt tensioning pulleys such as 103 and 104 may be provided for maintaining proper tension on the belts.

From the foregoing it is thought that the construction and operation of the fish deheading apparatus will be readily understood. The fish are manually positioned in the fish carriers and, during positioning, are pressed noseward against the nose engaging members to push the latter forwardly against the stops 65a. As the fish receiving carriers are advanced by the conveyor means, the cams 68a–68c engage the followers 69 on the nose engaging members and move the nose engaging members in a direction to shift the fish tailward in the carriers until the protuberances such as the pectoral fins on the fish engage the fish locating shoulder or stop 25c at the end of the body receiving carrier. By reason of the downwardly and forwardly inclined arrangement of the V-shaped nose engaging members 62, the fish head is pressed downwardly against the bottom of the head receiving carrier and is centered thereby. The inclination of the V-shaped nose engaging members is preferably made somewhat less than forty-five degrees relative to the bottom 25a of the head receiving carrier so as to firmly press the fish head downwardly against the bottom of the head receiving carrier to support and hold the fish head in the carrier during the subsequent cutting operation. Thus, when the fish is in proper position in the carriers, the fish is held against tailward movement by the pectoral fins P engaging the shoulder or stop 25c on the body receiving carrier and the fish is held against forward movement in the carriers by the nose engaging members on the head receiving carriers. The angulated cutter blades 71 and 72 form intersecting cuts at an angle selected so as to maintain the maximum flesh on the body of the fish. The fish heads are carried with the fish receiving carriers and are discharged therefrom as they pass around the sprockets 43 and the bodies advance with the body receiving carriers and are discharged by the discharge means 15 into the chute 89.

What is claimed as new is:

1. In an apparatus for deheading fish including a plurality of first carrier members each defining a body receiving pocket and a plurality of second carrier members each defining a head receiving pocket, conveyor means for advancing the first and second carrier members sidewise in one direction along a path past a deheading station with respective ones of the first and second carrier members arranged in endwise aligned pairs extending transverse to said path and with the adjacent ends of the pockets in aligned pairs of the carrier members arranged to define an opening therebetween, head cutter means at said deheading station movable through said opening between aligned pockets as the carrier members are advanced along said path, the improvement comprising fish locating means for engaging a preselected protuberance on a fish when the fish is moved tailward to longitudinally position the fish, a nose engaging member mounted on each of said second carrier members for movement lengthwise of the head receiving pocket, and means for moving said nose engaging members relative to said second carrier members in a direction crosswise of said path toward the aligned one of said first carrier members as the carrier members are advanced in said one direction toward said deheading station to move a fish tailward until the selected protuberance on the fish engages said fish locating means.

2. An apparatus according to claim 1 wherein said fish locating means comprises a shoulder on one of said carrier members of each aligned pair arranged to engage said preselected protuberance on the fish as the fish is moved tailward.

3. An apparatus according to claim 1 wherein said fish locating means comprises a shoulder on each of said first carrier members facing in a direction toward a respective one of said second carrier members and arranged to engage a pectoral fin on a fish as the fish is moved tailward.

4. An apparatus according to claim 1 wherein said fish locating means comprises a shoulder on each of said first carrier members at the end thereof adjacent the aligned second carrier member.

5. An apparatus according to claim 4 wherein the first carrier members and the second carrier members are arranged during movement by the conveyor means along said path such that the bottom of the head receiving pocket in the second carrier member is offset slightly below the bottom of the body receiving pocket in the respective first carrier member at the adjacent ends thereof.

6. An apparatus according to claim 1 wherein each of said nose engaging members is slidably mounted on the respective second carrier member.

7. An apparatus according to claim 1 wherein each of said nose engaging members on the second carrier members converges in a direction away from the first carrier members toward the bottom of the head receiving pocket in the respective second carrier member to press the head toward the bottom of that pocket as the nose engaging member is moved toward the aligned one of the first carrier members.

8. An apparatus according to claim 7 wherein each of said nose engaging members has a generally V-shaped configuration as viewed in a direction crosswise of the head receiving pocket to aid in centering the fish.

9. An apparatus according to claim 1 wherein said means for moving said nose engaging members includes at least one cam member mounted alongside the path of movement of the second carrier members to engage the nose engaging members as the second carrier members move along said path toward said deheading station.

10. An apparatus according to claim 9 wherein said cam member is resiliently yieldable in a direction laterally of said path to apply a pressure to the nose engaging members sufficient to move the fish tailward in the carrier members until the preselected protuberance on the fish engages the fish locating means and insufficient to cause further tailward movement of the fish after the preselected protuberance on the fish engages the fish locating means.

11. An apparatus according to claim 10 including at least one other cam member separate from the first mentioned cam member engageable with the nose engaging members as the respective second carrier members move past the deheading station, said other cam member being resiliently yieldable in a direction laterally of said path.

12. An apparatus according to claim 1 wherein said head cutter means includes a first rotary cutter blade disposed in a first plane extending lengthwise of said path, said first blade extending upwardly from below the pockets to a level below the top of a fish in said body receiving pocket on the first carrier member, said cutter means including a second rotary cutter blade disposed in a plane extending lengthwise of said path and inclined to said plane, said second blade extending downwardly from above the pockets to a point adjacent the top of the first blade whereby the first and second blades form two angulated cuts to sever the fish head from the body.

13. An apparatus according to claim 1 wherein said second carrier members each comprises an upwardly opening tray having laterally extending flanges along the upper edges thereof, said nose engaging members each being slidably mounted on the flanges of a respective one of the second carrier members.

14. An apparatus according to claim 1 wherein said conveyor means includes a first endless conveyor for advancing said first carrier members and a second endless conveyor for advancing said second carrier members, said second conveyor having an outlet end thereof located intermediate the ends of said first conveyor.

15. An apparatus according to claim 14 including means overlying the second carrier members at said outlet end of said second conveyor for temporarily holding the fish heads in the second carrier members until the second carrier members move part way around said outlet end of said second conveyor and out of alignment with said first carrier members on the first conveyor.

16. An apparatus according to claim 15 including means adjacent said outlet end of said second conveyor and extending alongside the path of travel of said first carrier members at the ends thereof adjacent said second carrier members for inhibiting endwise movement of the fish bodies out of said first carrier members.

17. An apparatus according to claim 1 including cam means engageable with the nose engaging members on said second carrier members after the latter have moved past said head cutter means for moving said nose engaging members relative to the second carrier members in a direction crosswise of said path and away from the first carrier members to retract said nose engaging members.

18. An apparatus according to claim 1 including a rotary brush mounted for engagement with the fish bodies after the heads have been severed therefrom for moving the fish bodies endwise out of the respective first carrier members.

References Cited

UNITED STATES PATENTS

| 1,377,465 | 5/1921 | Cox | 17—3 |
| 1,632,200 | 6/1927 | Stafford | 17—3 |
| 2,245,330 | 6/1941 | Danielsson | 17—4 |
| 2,431,465 | 11/1947 | Christiansen | 17—4 |
| 2,799,043 | 7/1957 | Walker | 17—4 |
| 2,961,697 | 11/1960 | Schlichting | 17—4 X |

FOREIGN PATENTS

| 1,026,374 | 2/1953 | France. |
| Ad. 77,783 | 3/1962 | France. |

LUCIE H. LAUDENSLAGER, Primary Examiner